US007035282B1

(12) United States Patent
Jagadeesan et al.

(10) Patent No.: US 7,035,282 B1
(45) Date of Patent: Apr. 25, 2006

(54) WIDEBAND TELEPHONES, ADAPTERS, GATEWAYS, SOFTWARE AND METHODS FOR WIDEBAND TELEPHONY OVER IP NETWORK

(75) Inventors: Ramanathan Jagadeesan, San Jose, CA (US); Bich Nguyen, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 836 days.

(21) Appl. No.: 09/832,456

(22) Filed: Apr. 10, 2001

(51) Int. Cl.
*H04J 3/16* (2006.01)
(52) U.S. Cl. .................... 370/465; 370/401; 370/469
(58) Field of Classification Search ................ 370/352, 370/354, 376, 389, 392, 401, 419, 228, 229, 370/260, 262, 286, 353, 356, 402, 465, 493, 370/494, 495, 355, 466, 467, 469, 474; 379/88.17, 379/93.01
See application file for complete search history.

(56) References Cited

U.S. PATENT DOCUMENTS

| | | | |
|---|---|---|---|
| 5,790,548 A * | 8/1998 | Sistanizadeh et al. ........ | 370/401 |
| 5,940,479 A * | 8/1999 | Guy et al. ................ | 379/93.01 |
| 6,064,653 A * | 5/2000 | Farris .......................... | 370/237 |
| 6,195,358 B1 * | 2/2001 | Bowater et al. ............. | 370/401 |
| 6,233,318 B1 * | 5/2001 | Picard et al. ............. | 379/88.17 |
| 6,282,192 B1 * | 8/2001 | Murphy et al. ............. | 370/352 |
| 6,404,746 B1 * | 6/2002 | Cave et al. .................. | 370/262 |
| 6,449,269 B1 * | 9/2002 | Edholm ....................... | 370/352 |
| 6,487,196 B1 * | 11/2002 | Verthein et al. ............ | 370/352 |
| 6,512,764 B1 * | 1/2003 | Carew et al. ............... | 370/356 |
| 6,704,309 B1 * | 3/2004 | Nada et al. ................. | 370/389 |
| 6,707,797 B1 * | 3/2004 | Gardell et al. ............. | 370/260 |
| 6,711,160 B1 * | 3/2004 | Chan et al. ................. | 370/354 |
| 6,850,577 B1 * | 2/2005 | Li ............................... | 375/326 |
| 6,904,037 B1 * | 6/2005 | Oran et al. ................. | 370/352 |
| 2001/0014095 A1 * | 8/2001 | Kawahata et al. .......... | 370/392 |
| 2002/0071424 A1 * | 6/2002 | Chiu et al. .................. | 370/352 |

* cited by examiner

*Primary Examiner*—Phirin Sam
(74) *Attorney, Agent, or Firm*—Marger Johnson & McCollom, P.C.

(57) ABSTRACT

Wideband telephones, gateways, adapters, software, and methods are provided for implementing wideband telephony over a network. A WB IP telephone has a WB telephone, a codec for encoding voice into voice data bits, and a packetizer for encoding groups of the voice data bits in intermediate packets. An adapter for an analog WB telephone has a digital to analog converter, a codec and a packetizer. The intermediate packets are generally not in form that would be ready for network transmission. The WB IP telephone also includes a modem for connecting to the network over a telephone line. A voice gateway receives the encoded voice, and adds packet headers to it, to make it suitable for transmission through the network to a cooperating gateway. The cooperating gateway in turn strips the headers for the receiving WB IP telephone. The WB IP telephones can thus be connected to the network using only PSTN lines.

51 Claims, 8 Drawing Sheets

500

510 ESTABLISH A FIRST PACKET SWITCHED CONNECTION THROUGH A NETWORK WITH A DEVICE AT AN ENDPOINT OF THE NETWORK

515 RECEIVE SECOND DIALING INFORMATION

520 ESTABLISH A SECOND CIRCUIT SWITCHED TELEPHONE CONNECTION WITH A MODEM (USING THE SECOND DIALING INFORMATION)

525 EXCHANGE CAPABILITIES DATA WITH THE MODEM

530 RECEIVE THROUGH THE FIRST CONNECTION A STREAM OF NETWORK PACKETS THAT TRANSPORT VOICE DATA BITS WHICH ENCODE SOUND AT A RATE OF AT LEAST 16 KBPS

550 STRIP HEADERS FROM THE NETWORK PACKETS TO PRODUCE INTERMEDIATE PACKETS

560 TRANSMIT THE INTERMEDIATE PACKETS THROUGH THE SECOND CONNECTION

FIG. 5

WIDEBAND TELEPHONES, ADAPTERS, GATEWAYS, SOFTWARE AND METHODS FOR WIDEBAND TELEPHONY OVER IP NETWORK

BACKGROUND OF THE INVENTION

1. Field of the Invention

The present invention is related to the field of telephony, and more specifically to devices, software and methods for implementing a wideband telephony through a network.

2. Description of the Related Art

Conventional telephony uses the Public Switched Telephone Network (PSTN). A direct, dedicated connection is typically established between two subscribers. Such a connection is called circuit switched.

Wideband (WB) telephony is an improvement over common telephony. It encodes a larger portion of the voice frequency range than conventional telephony does, namely from 150 Hz to 7.1 kHz. Since more of the voice sound frequencies are captured, the wider range has resulted in more satisfactory user experience.

A challenge with WB telephony is that it requires a lot of bandwidth to transmit the extra sound frequencies. In fact it requires more bandwidth than is made available by the conventional lines of the PSTN, which is why WB telephony cannot take place via the common PSTN lines.

One way this problem has been addressed is by using special telephone lines, which are also called broadband. These can accommodate the required bandwidth of the WB telephones. The reality remains, however, that broadband lines are not commonly installed.

A recent development is that telephony can be implemented via networks, such as the internet. In this case, the users transmit to each other data packets that are suitable for network transmission, and which encode the voices of the participants.

The advent of network telephony, however, does not solve the problems of WB telephony. This is because the vast majority of users use common modems, such as V.90 dial up modems, to dial into a network gateway via common PSTN lines. While the network itself could transmit packets corresponding to the broadband signal of WB telephony, the transmission bottleneck remains the common modems and telephone lines. The bottleneck occurs because, for a voice signal to be prepared for network transmission, it needs to be packetized. Packetizing involves adding leading headers (also known as leaders) and trailing headers (also known as trailers) to the voice data. Once the leaders and the trailers are added, however, there are more data than can be transmitted via the common telephone lines and modems in real time.

BRIEF SUMMARY OF THE INVENTION

The present invention overcomes these problems and limitations of the prior art.

Generally, the present invention provides wideband telephones, adapters, gateways, software, and methods for implementing wideband telephony over an IP network.

A WB IP telephone according to the invention has a WB telephone, a codec for encoding voice, and a packetizer-depacketizer for preparing intermediate packets. The intermediate packets are generally not in form that would be ready for network transmission. The WB IP telephone also includes a modem for connecting to the IP network over a telephone line.

A gateway according to the invention is a voice gateway that receives the intermediate packets. The gateway adds packet headers to prepare network packets, i.e. packets that are suitable for transmission through the IP network to a cooperating gateway.

An adapter according to the invention includes a digital to analog converter, a codec for encoding voice, a packetizer for preparing intermediate packets out of the encoded voice, and a modem for connecting to the IP network over a telephone line.

The invention offers the advantage that an ordinary PSTN line may be used for connecting the WB IP telephone to the cooperating voice gateway of the IP network. Packet headers are added after the bottleneck presented by the narrow bandwidth of the PSTN line. This way the invention permits high quality WB IP telephony, while the participants use ordinary PSTN lines. In fact, it even permits a data connection to remain active simultaneously with a voice call, which in turn permits a number of integrated voice-data applications.

In addition, the adapter eliminates the requirement for broadband telephone lines. A common circuit switched line may be used for connecting the adapter to a network such as the internet.

The invention will become more readily apparent from the following Detailed Description, which proceeds with reference to the drawings, in which:

BRIEF DESCRIPTION OF THE DRAWINGS

FIG. 5 is a flowchart illustrating a method according to another embodiment of the invention.

DETAILED DESCRIPTION OF THE PREFERRED EMBODIMENT(S)

As has been mentioned, the present invention provides wideband telephones, gateways, software and methods for wideband telephony over an IP network. The invention is now described in more detail.

Figure 1:
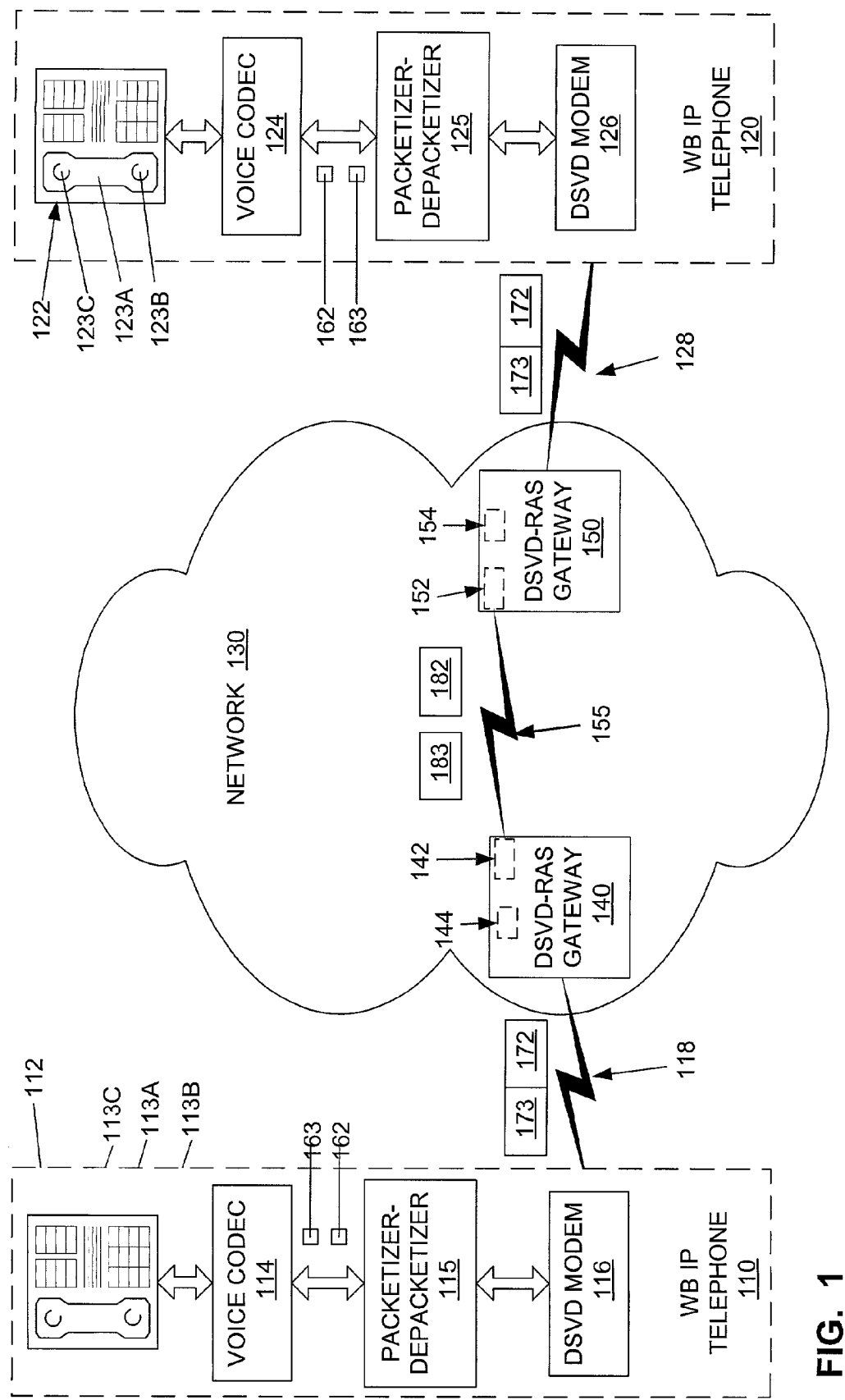
FIG. 1 is a diagram illustrating two WB IP telephones made according to embodiments of the invention, that communicate via two voice gateways made according to embodiments of the invention and through an IP network.

Referring now to FIG. 1, two WB IP telephones 110, 120 are shown, which are made according to embodiments of the invention. While they are shown having similar components, that is not necessarily the case. They may be different embodiments, and still be able to establish a connection according to the invention.

WB IP telephone 110 includes a WB telephone 112. WB telephone 112 includes a handset 113A with a microphone 113B and a speaker 113C. Microphone 113B is adapted to convert sound (such as voice) into sound signals, which capture a bandwidth of the sound that includes at least a range of 300 Hz to 3300 Hz. Preferably the range is wider, such as 200 Hz to 5 kHz, or even the full wideband range of 150 Hz to 7.1 kHz, or even wider.

WB IP telephone 110 additionally includes a voice codec 114. Codec 114 includes an encoder and a decoder. The encoder is coupled to receive the sound signals from microphone 113B, and to encode them as groups of voice data bits 162, 163. The decoder is coupled to receive other voice data bits, such as return voice data bits in a two way communication situation. The decoder decodes the return voice data bits into return sound signals for speaker 113C. The return sound signals will preferably have the same wide bandwidth.

Groups 162, 163 may be a series of frames. But they need not, and might not meet a minimum protocol for transmission through a network.

WB IP telephone 110 also includes a packetizer-depacketizer 115, which receives groups 162, 163. Packetizer-depacketizer 115 adds packet headers to groups 162, 163, which yields intermediate packets 172, 173. Intermediate packets 172, 173 are not necessarily suitable for transmission through a network, as will be explained in more detail below.

WB IP telephone 110 also includes a modem 116, which may be implemented with a V.90 dial-up modem. Modem 116 may be adapted to establish a first circuit switched connection 118 with a voice gateway in a network. Modem 116 may be coupled to transmit the voice data bits through the first connection 118.

Modem 116 may optionally include means for multiplexing additional data with the voice data bits prior to transmitting. Such would be accomplished by having modem 116 be a Digital Simultaneous Voice and Data (DSVD) modem. Multiplexing may take place according to the International Telecommunications Union (ITU) standard V.75, that is also used for DSVD. In addition, the multiplexing scheme defined in ITU Recommendation V.76 uses a High level Data Link Control (HDLC) frame structure with overhead of 5 to 8 bytes per frame which, for 20 msec long frames yields 2 kbps to 3.2 kbps.

Modem 116 may be used for receiving return voice data bits from connection 118. In that case, the return voice data bits are input in the decoder, to produce the return sound signals described above.

WB IP telephone 120 includes a WB telephone 122, which has a handset 123A with a microphone 123B and a speaker 123C. WB IP telephone 120 also includes a voice codec 124, and a packetizer-depacketizer 125, which may be implemented as part of a larger Digital Signal Processing (DSP) architecture. WB IP telephone 120 moreover includes a modem 126, which may be implemented by a DSVD modem.

The connection of WB IP telephone 110 with WB IP telephone 120 may be through a network 130. Network 130 may be an Internet Protocol (IP) network, such as the internet. Each network defines protocols that data packets must meet in order to be transmitted through it. Some of these protocols are more demanding, while others can be implemented faster. In any event, each network defines a minimum such protocol that the data packets must meet.

Gateways 140, 150 made according to embodiments of the invention are now described. They are advantageously used at endpoints of network 130. They may be made by adjusting any suitable network device, such as a bridge, a router, etc.

In the preferred embodiment, gateways 140, 150 are implemented by a DSVD-RAS (Remote Access Gateway), which may be configured to operate as a voice gateway. Gateway 140 may have a network interface 142 for coupling to network 130, and a processor 144 coupled with the network interface 142. Processor 144 may be implemented as a digital signal processor (DSP), or in other equivalent ways known in the art. Similarly, gateway 150 may have a network interface 152 for coupling to network 130, and a processor 154 coupled with the network interface 152.

WB IP telephone 110 is capable of establishing a circuit switched connection 118 with gateway 140. Similarly, WB IP telephone 120 is capable of establishing a circuit switched connection 128 with gateway 150. One way is to use ITU standard H.245 as the means for capability exchange, channel establishment, release, and out-of-band control.

Connections 118, 128 may advantageously be established over common PSTN lines. They may be low speed modem links for modems 116, 126 respectively. As such, connections 118, 128 may have a rated capacity of only 28.8 kbps, and the invention will still work.

In addition, gateway 140 may establish a communication connection 155 with gateway 150. Connection 155 is packet switched, over one of the protocols permitted by network 130. Unlike with a regular voice gateway, if gateway 140 is implemented with a DSVD-RAS-voice gateway, then gateway 140 need not perform any voice compression (transcoding) if gateway 150 also supports the type of voice codec 114 that is being used.

A user of WB IP telephone 110 may communicate with a user of WB IP telephone 120 via a series of connections 118, 155 and 128. The ultimate connection may be a wideband connection, even though connections 118, 128 may be circuit switched. That is because the packetization overhead is carried only over the connection 155.

Indeed, sound signals are encoded by codec 114 into groups 162, 163 of voice data bits. These groups may be frames, such as sound lasting 20 msec each. In any event, the voice data bits may be contiguous, whether considered as groups or not.

Groups 162, 163 may further become packetized by packetizer-depacketizer 115 as intermediate packets 172, 173 for transmission through the PSTN lines according to the invention.

Gateway 140 receives intermediate packets 172, 173, and packetizes them further as network packets 182, 183, respectively. Packets 182, 183 may be transmitted within network 130 via connection 155 to gateway 150.

Gateway 150 performs the reverse action of gateway 140, to recover intermediate packets 172, 173. Then intermediate packets 172, 173 are transmitted via connection 128 to IP telephone 120. Codec 124 converts intermediate packets 172, 173 back into voice data groups 162, 163 of voice data bits. This is explained in more detail below.

The WB IP telephones and gateways of the invention may support two-way communication. What has been written above about groups 172, 173 being transmitted from WB IP telephone 110 to WB IP telephone 120 applies also for the reverse route.

Figure 2A:
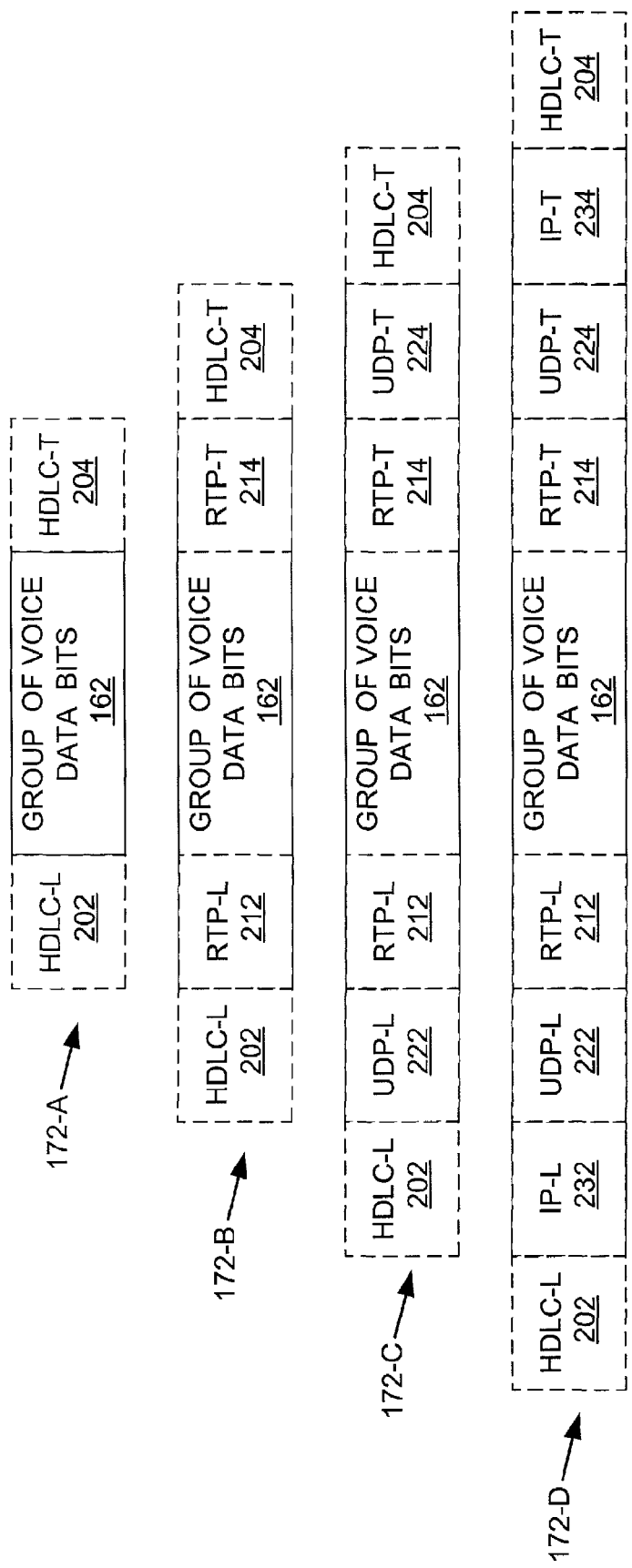
FIG. 2A is a diagram illustrating possible formats for intermediate packets being transmitted through PSTN lines according to embodiments of the invention.

Referring now to FIG. 2A, drawings of the data formats are given to illustrate the action of packetizer-depacketizers 115, 125 on groups 162, 163. Four possible formats are given for a single group 162 of voice data bits. It will be apparent that more formats are possible. In addition, protocols are given as requiring both a leader and a trailer. That need not be true in all circumstances, and only one of the headers may be required. In this document, however, two headers are shown in all instances, to better convey the concept of encapsulating a payload.

Group 162 may be encoded as intermediate packet 172-A, which means no more encoding at all. In addition, intermediate packet 172-A may include an HDLC leader HDLC-L 202 and an HDLC trailer HDLC-T 204 for transmission through lines 118, 124. Otherwise, however, intermediate packet 172-A does not include other leaders or trailers that would facilitate its transmission through network 130.

Group 162 may be alternately encoded as intermediate packet 172-B, by additionally receiving data for meeting the Real Time Transport Protocol (RTP). The additional data may be a RTP-L leader 212 and a RTP-T trailer 214.

Group 162 may be otherwise encoded as intermediate packet 172-C. This means receiving data for meeting also the User Datagram Protocol (UDP), in addition to RTP. The additional data may be a UDP-L leader 222 and an UDP-T trailer 224. Intermediate packet 172-C may be suitable for being transmitted as a full packet under a UDP protocol, but not under an IP protocol.

Group 162 may be alternately encoded as intermediate packet 172-D. This means receiving data for further meeting the Internet Protocol (IP), in addition to UDP. The additional data may be an IP-L leader 232 and an IP-T trailer 234.

In all these choices, it will be observed that the intermediate packets 172-A, 172-B, 172-C, 172-D are progressively larger, and thus progressively less efficient to transport through connections 118, 128. The less data in a group, the less bandwidth it needs. That is why it is possible to use PSTN lines connections 118, 128 of the present invention.

Figure 2B:
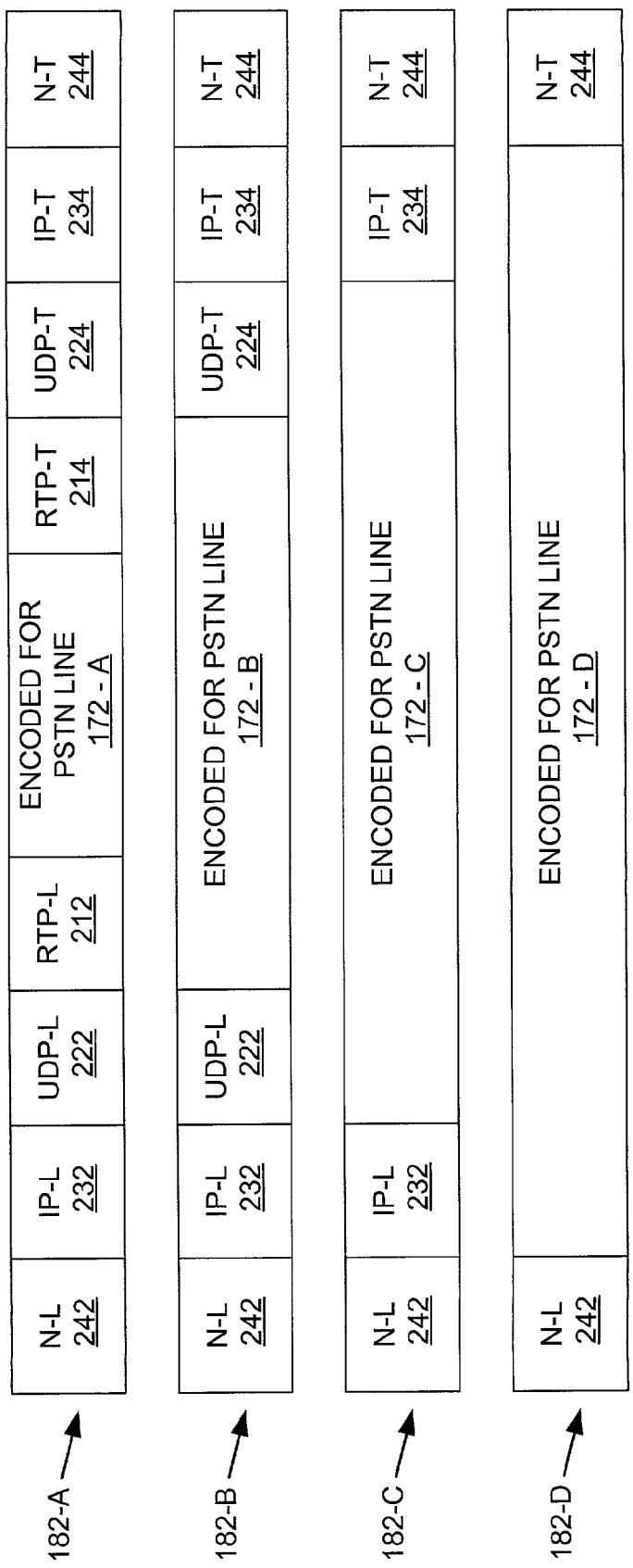
FIG. 2B is a diagram illustrating formats for network data packets made from the intermediate packets of FIG. 2A being transmitted through an IP network according to embodiments of the invention.

Referring now to FIG. 2B, drawings of the data formats are given to illustrate the action of gateways 140, 150 on intermediate packets 172, 173. Four possible formats are given for a single pair of an intermediate packet 172 with a corresponding network packet 182 using an IP protocol, and two formats are given using a UDP protocol. It will be apparent that more formats are possible, for example by combinations of the depicted formats. Plus, the chosen format would apply also to the other pairs of the data, such as to intermediate packet 173 with corresponding packet 183, etc.

Intermediate packet 172-A may be encoded as network packet 182-A. This means that intermediate packet 172-A is first stripped from any of the HDLC headers, namely HDLC-L 202 and HDLC-T 204. The remainder is to receive data for meeting the Real Time Transport Protocol (RTP), the UDP protocol, the IP protocol, and the network protocol. The additional data may be a leader RTP-L 212 with a trailer RTP-T 214, a leader UDP-L 222 with a trailer UDP-T 224, and a leader IP-L 232 and with a trailer IP-T 234. In addition, for the network protocol, the additional data may be a leader N-L 242 with a trailer N-T 244. Leader N-L 242 and trailer N-T 244 may be specific to the network. The resulting network packet 182-A is thus a packet suitable for being transmitted through the network.

Intermediate packet 172-B may be encoded as network packet 182-B. This means that intermediate packet 172-B is to receive data only for meeting the UDP protocol, the IP protocol, and the network protocol. The resulting network packet 182-B is thus similar to network packet 182-A.

Intermediate packet 172-C may be encoded as network packet 182-C. This means that intermediate packet 172-C is to receive data only for meeting the IP protocol, and the network protocol. The resulting network packet 182-C is thus similar to network packet 182-A.

Intermediate packet 172-D may be encoded as network packet 182-D. This means that intermediate packet 172-D is to receive data only for meeting the network protocol. The resulting network packet 182-D is thus similar to network packet 182-A.

In all these choices, it will be observed that network packets 182-A, 182-B, 182-C, 182-D are similar in content, especially consulting FIG. 2A. Thus they are all suitable for transmission under the network connection 155. However, intermediate packets 172-A, 172-B, 172-C, 172-D are progressively larger, and thus progressively less efficient for retransmission through connections 118, 128 that use PSTN lines. From these considerations, it occurs that the most efficient scheme is that of intermediate packet 172-A.

As such, gateway 140 receives intermediate packet 172, and outputs a data packet 182, suitable for transmission through network 130. The action is called packetization, and also encapsulation of the voice data bits with the headers.

Receiving gateway 150 performs the reverse action. It receives network packets 182, 183, and strips them from at least some of their headers, to reproduce intermediate packets 172, 173 respectively. This is called depacketizing.

It is readily obvious that the voice data groups in circuit switched connection 118 need not be encoded similarly to that in circuit switched connection 128. The exact format used (e.g. the choice of one of the schemes of intermediate packet 172-A, 172-B, 172-C, 172-D or other) for each one of the connections 118, 128 is determined between the devices at the two ends of each connection. In other words, it is perfectly possible that, in the arrangement of FIG. 1, group 162 is packetized as intermediate packet 172-A in connection 118, while it is depacketized as intermediate packet 172-C in connection 128.

Figure 6:
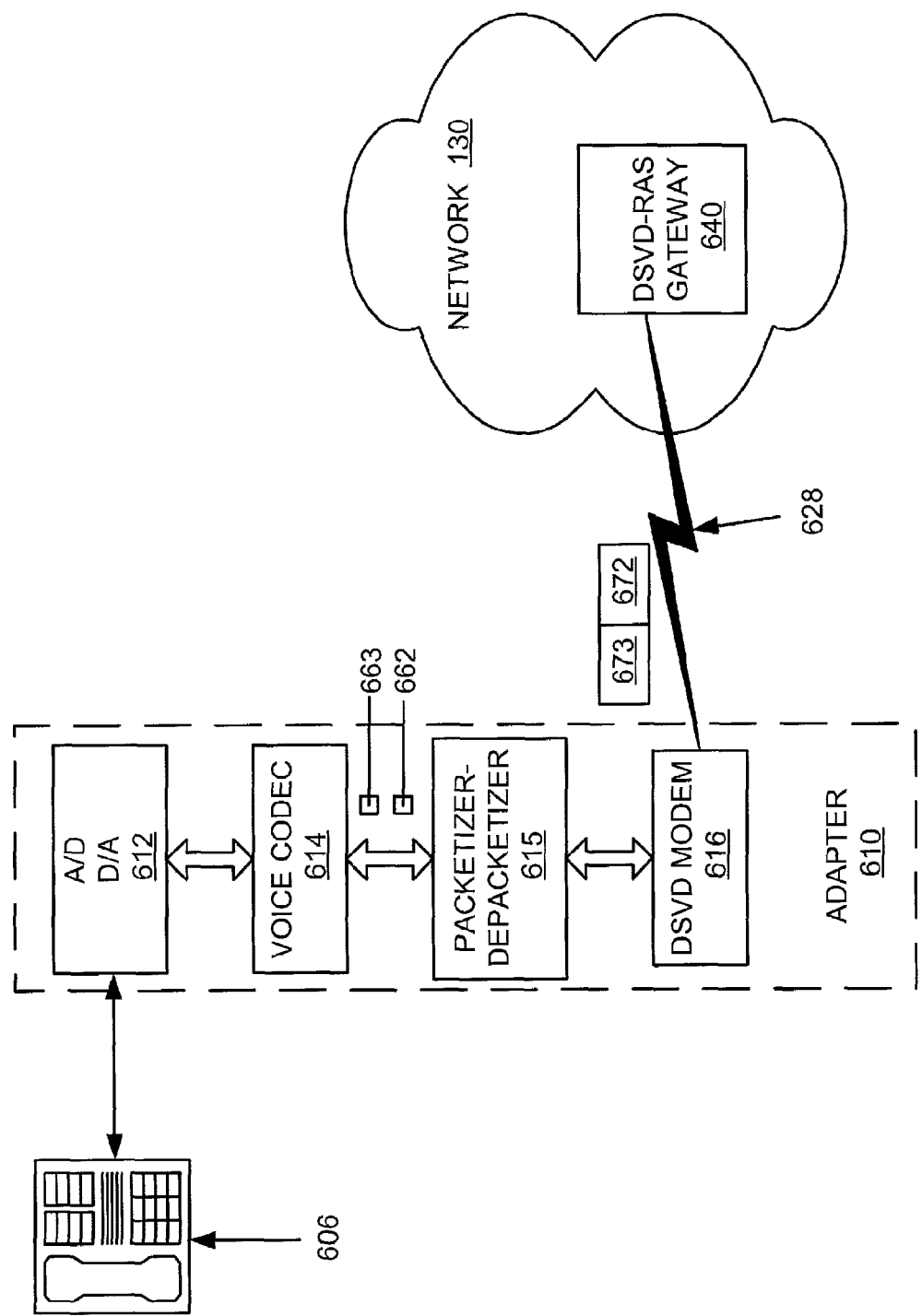
FIG. 6 is a diagram illustrating an adapter for an analog WB telephone made according to an embodiment of the invention.

Referring now to FIG. 6, an adapter 610 according to the invention is described. Adapter 610 is for working with an analog wideband telephone 606, such as those in the prior art. Adapter 610 assists telephone 606 to communicate with a voice gateway 640 similar to voice gateway 140. Adapter 610 is preferably located in the same place as telephone 606.

Adapter 610 includes an analog to digital (A/D) and a digital to analog (D/A) converter 612. Converter 612 is for digitizing voice signals received from the analog wideband telephone 606. The D/A component works equivalently in receiving voice.

Adapter 610 also includes a voice codec 614, similar to codec 114. Codec 614 includes an encoder that produces groups 662, 663 of encoded voice data bits similar to groups 162, 163.

Adapter 610 moreover includes a packetizer-depacketizer 615 similar to packetizer-depacketizer 115. Packetizer-depacketizer 615 includes a packetizer that receives groups 662, 663, and produces intermediate packets 672, 673, similar to intermediate packets 172, 173.

Adapter 610 optionally also includes a modem 616 adapted to establish a first circuit switched connection with the voice gateway. Modem 616 need not be a DSVD modem. Modem 616 is adapted to be coupled to transmit the intermediate packets through a first connection with gateway 640.

These components also have opposite sides, for equivalently working also in the reverse direction. More particularly, the depacketizer component of packetizer-depacketizer 615 receives return intermediate packets to produce return voice data bits. The return voice data bits are decoded by the decoder of codec 614, to produce a digital return voice signal. The digital return voice signal is converted to an analog return voice signal by the D/A converter.

It is apparent that the present invention may be implemented by one or more devices that include logic circuitry. It may also be implemented by a device that includes a dedicated processor system, which may include a microcontroller or a microprocessor.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program, and a method of operation of the program. The program is most advantageously implemented as a program for a computing machine, such as a general-purpose computer, a special purpose computer, a microprocessor, etc.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they may be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described, referring also to FIG. 1 and FIG. 2.

Figure 3:
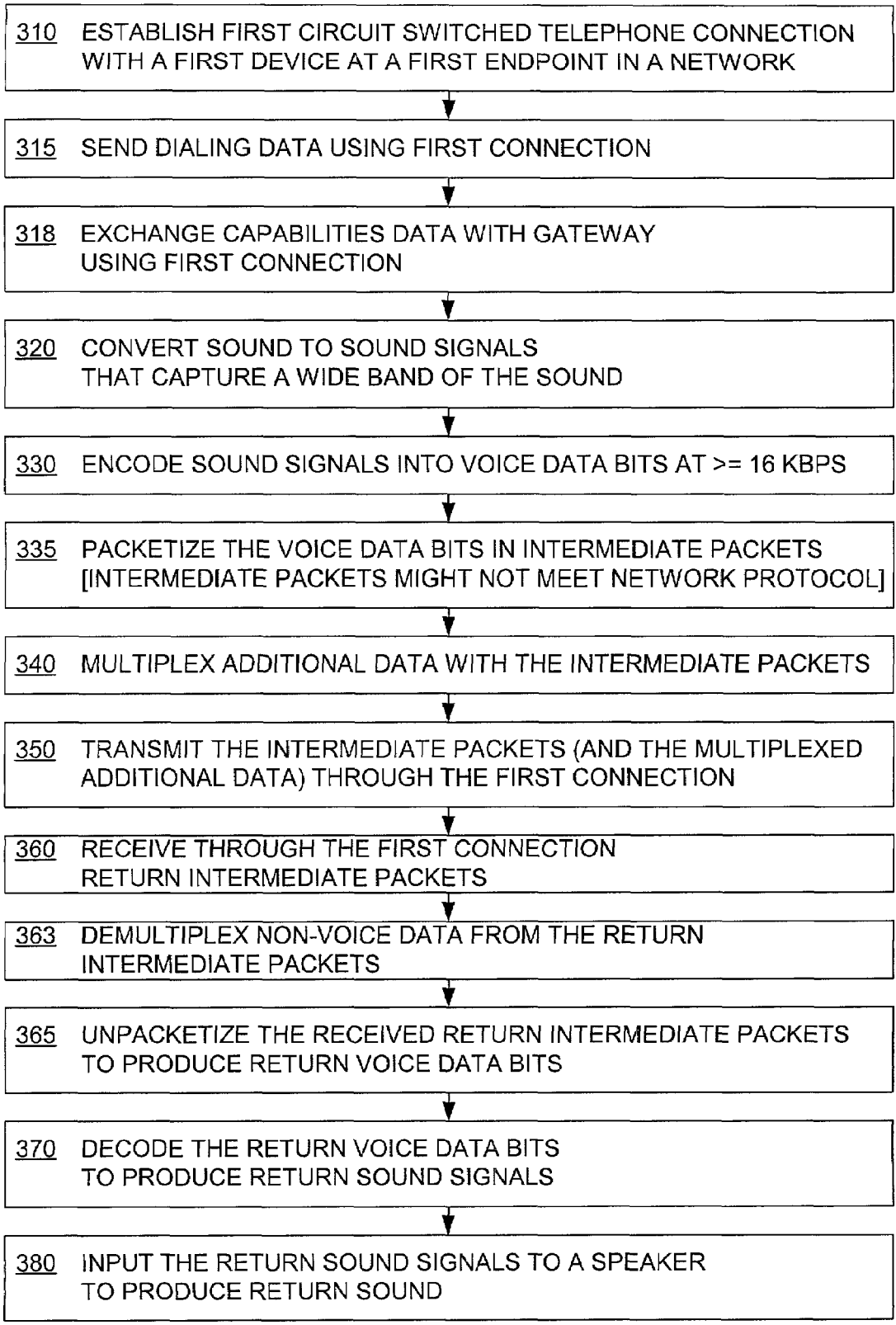
FIG. 3 is a flowchart illustrating a method according to an embodiment of the invention.

Referring now to FIG. 3, a flowchart 300 is used to illustrate a method according to an embodiment of the invention. This method may be performed by a WB IP telephone made according to the invention.

According to a box 310, a first circuit switched telephone connection 118 is established with a first device 140 that is at a first endpoint in a network 130. Network 130 can transmit data packets that meet a minimum protocol.

According to a next box 315, a first dialing information is sent to gateway 140, using the first connection. The dialing information is about the digits or data dialed by the user.

According to a next box 318, the capabilities of the device are sent using the first connection. These may include the type and rate of voice compression (by codec 114), and the type of intermediate packetization (172-A, 172-B, 172-C, 172-D, by packetizer-depacketizer 115). The capabilities (such as above) of the gateway 140 are received from the first connection. The suitable parameters such as voice compression type, rate, and type of packetization is chosen, using the capabilities information exchanged above, for use for this call.

According to a next box 320, sound is converted to sound signals that capture preferably a wide band of the sound. This can be performed with microphone 113B. The band may be 300 Hz to 3300 Hz, but is preferably wider, such as 200 Hz to 5 kHz, or even the full wideband range of 150 Hz to 7.1 kHz, or even wider.

According to a next box 330, the sound signals are encoded into voice data bits. Encoding may be at a rate of at least 16 kbps. Encoding is preferably at an even higher rate, such as at 20 kbps, e.g. 24 kbps. The higher the encoding rate, the more bandwidth of the sound is captured, and the better the user experience becomes.

According to a next box 335, the voice data bits are packetized in intermediate packets. These intermediate packets may or may not meet the minimum protocol that packets must meet for retransmission in the network. For example, referring briefly to FIG. 2A, intermediate packet 172-A does not meet the minimum protocol of an IP network. Intermediate packet 172-C meets a UDP protocol, which may be the minimum for an IP network.

According to an optional next box 340, additional data is multiplexed with the intermediate packets. This may be performed if a modem is a DSVD modem. The additional data need not be voice data.

According to a next box 350, the intermediate packets are transmitted through the first connection 118. These will include the multiplexed additional data, if the optional operation of box 340 has taken place. The intermediate packets will require less bandwidth than in the prior art. It will be the least, if the format of intermediate packet 172-A is used.

According to an optional next box 360, return intermediate packets are received through the first connection. These correspond to two-way communication.

According to an optional next box 363, any non-voice data is demultiplexed from the return intermediate packets. This is the inverse action of what was described in box 340.

According to a next box 365, the return intermediate packets are unpacketized to produce return voice data bits. Unpacketizing in this case includes stripping any remaining headers, etc.

According to a next box 370, the return voice data bits are decoded to produce return sound signals. This is best implemented by the decoder portion of codec 114. Decoding may include stripping some remaining headers to recover group 162 from intermediate packet 172, depending on the embodiment used.

According to a next box 380, the return sound signals are input to a speaker 113C to produce a return sound.

Figure 4:
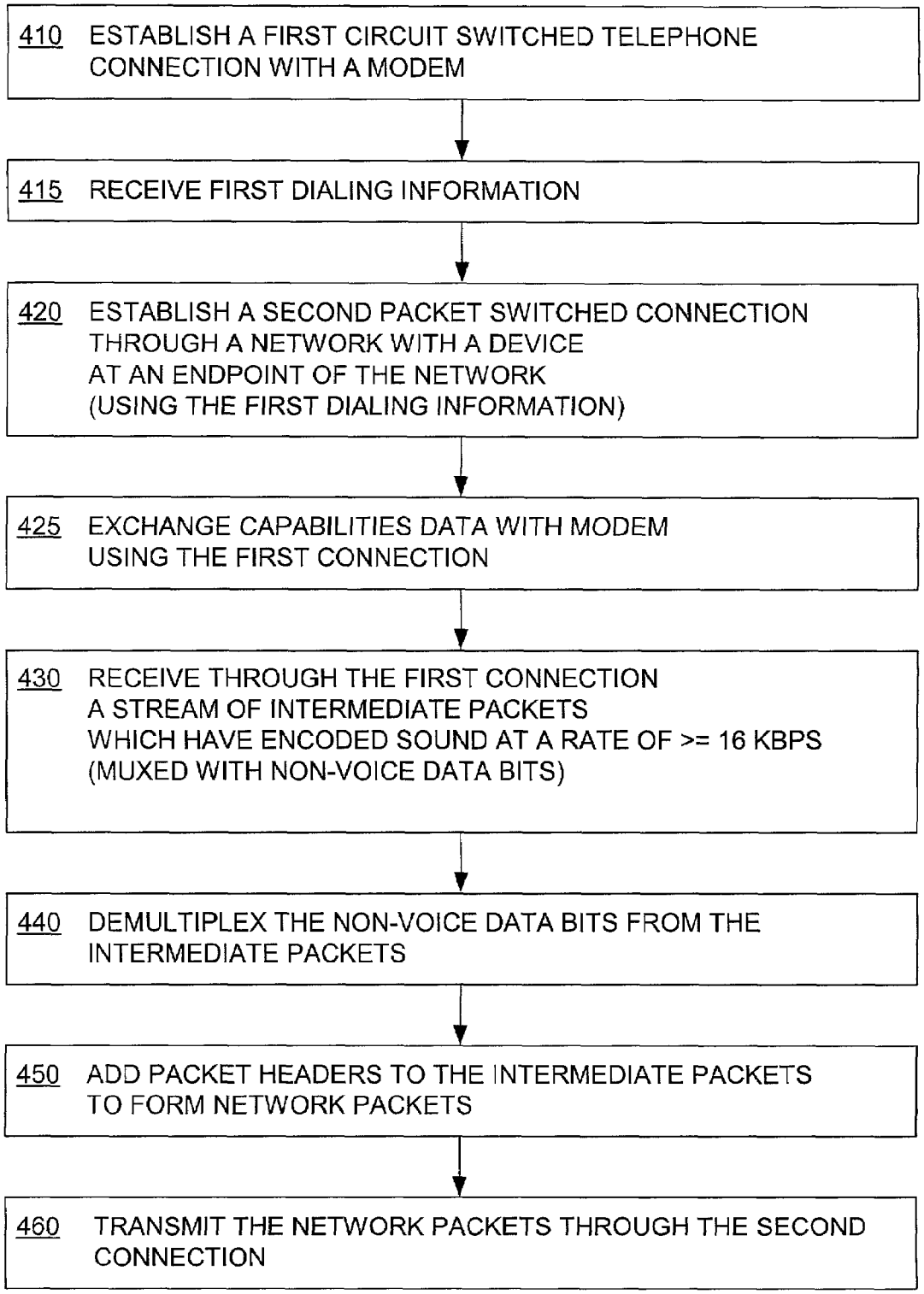
FIG. 4 is a flowchart illustrating a method according to another embodiment of the invention.

Referring now to FIG. 4, a flowchart 400 is used to illustrate a method according to another embodiment of the invention. This method may be performed by a gateway 140 made according to the invention.

According to a box 410, a first circuit switched telephone connection 118 is established with a modem 116. This may be performed by accepting a call from modem 116. Also, capabilities data of the gateway 140 are sent to device 110 using the first connection. The suitable parameters such as voice compression type, rate, and type of packetization is chosen, using the capabilities information exchanged above, for use for this call.

According to a next box 415, a first dialing information is received, preferably from the first connection. The first dialing information is about the WB IP telephone 120, and a gateway 150 that it might be associated with.

According to a next box 420, a second packet switched connection 155 is established through network 130 with a device 150 at an endpoint of the network 130. This may be performed by calling device 150, using the first dialing information. Device 150 then also may call WB IP telephone 120, as discussed below.

According to a next box 425, capabilities data about WB IP telephone 110 is received from the first connection. This data is about the type and rate of voice compression (by codec 114), and the type of packetization (by packetizer-depacketizer 115, which can be performed by device 110.

According to a next box 430, a stream of intermediate packets 172, 173 is received through the first connection 118. Intermediate packets 172, 173 may be multiplexed with non-voice data bits. The voice data bits may have been encoded at a rate of 16 kbps. The rate may be even higher, such as 20 kbps, or even 24 kbps. As such, they represent a wide band of sound, such as a range of 200 Hz to 5 kHz, or even 150 Hz to 7.1 kHz, or even higher.

According to an optional next box 440, the non-voice data bits are demultiplexed from the intermediate packets. That is in the event that the other data had been multiplexed with the intermediate packets.

According to a next box 450, packet headers are added to intermediate packets 172, 173, to form respective packets 182, 183.

According to a next box 460, network packets 182, 183 are transmitted through the second connection 155. Subsequently, the data are retransmitted to WB IP telephone 120, as discussed below.

Referring now to FIG. 5, a flowchart 500 is used to illustrate a method according to another embodiment of the invention. This method may be performed by a gateway 150 made according to the invention.

According to a box 510, a first packet switched connection 155 is established through network 130 with a device 150 at an endpoint of the network 130. This may per performed by accepting a call from gateway 140.

According to a next box 515, a second dialing information is received, preferably from the first connection. The second dialing information is about the WB IP telephone 120, such as its telephone number.

According to a next box 520, a second circuit switched telephone connection 128 is established with a modem 126. This may be performed by dialing the WB IP telephone 120, using the second dialing information.

According to a next box 525, capabilities data is exchanged, while the call is being set up.

According to a next box 530, a stream of network packets 182, 183 is received through the first connection 155. These voice data that may have been encoded at a high rate of at least 16 kbps, such as 20 kbps, or even 24 kbps. As such, they represent a wide band of sound, such as a range of 200 Hz to 5 kHz, or even 150 Hz to 7.1 kHz, or even higher.

According to a next box 550, at least some of the headers are stripped from network packets 182, 183, to yield intermediate packets 172, 173, respectively.

According to a next box 560, the yielded intermediate packets 172, 173 are transmitted through the second connection 128.

Figure 7:
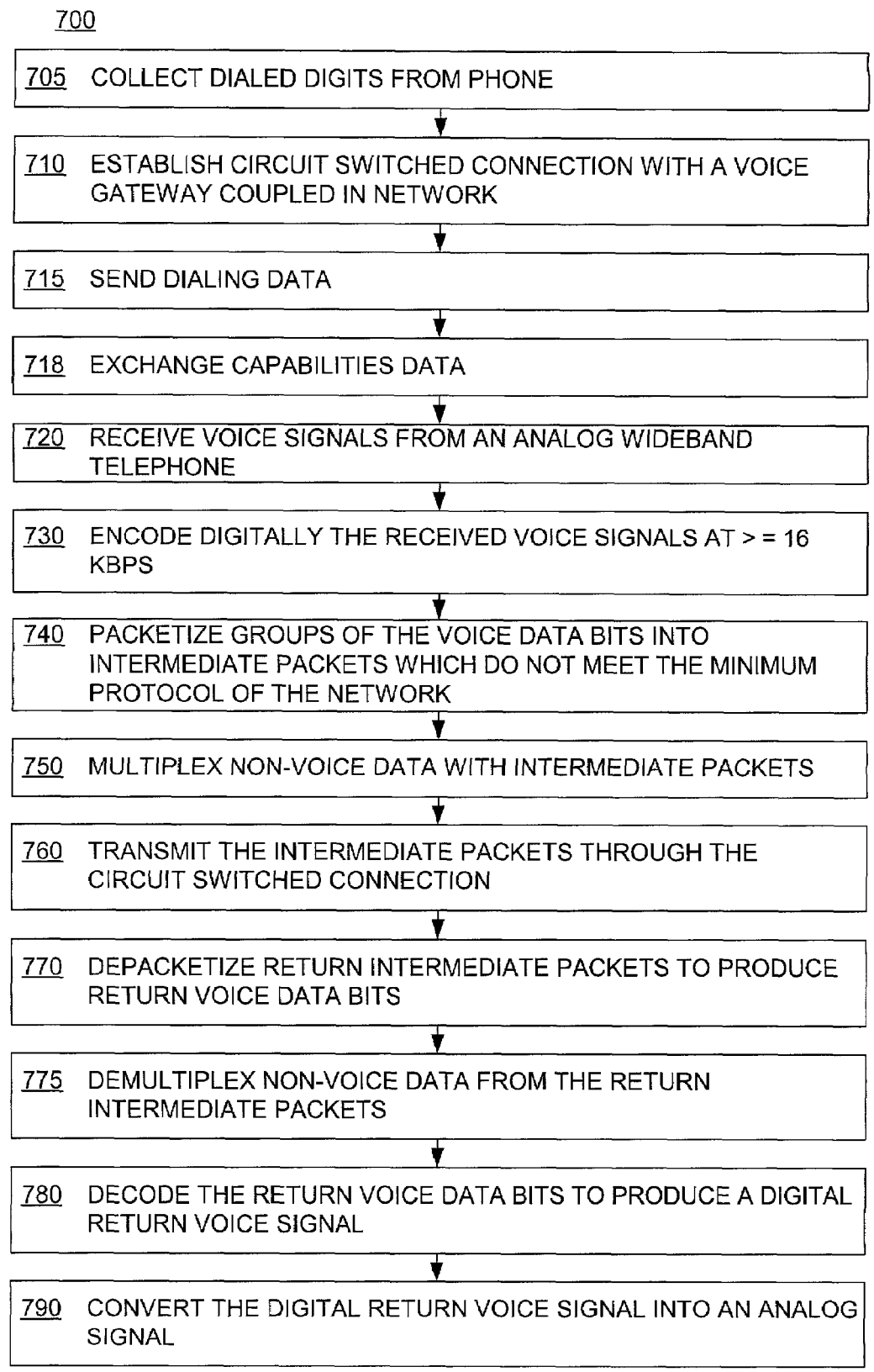
FIG. 7 is a flowchart illustrating a method according to yet another embodiment of the invention.

Referring now to FIG. 7, a flowchart 700 is used to illustrate a method according to an embodiment of the invention. The method of flowchart 700 may be performed by an adapter, such as adapter 610.

According to a box 705, the digits dialed from a phone, such as phone 606 are collected.

According to a next box 710, a circuit switched connection is established with a voice gateway coupled in a network.

According to a next box 715, a first dialing information is sent to gateway 640, using the circuit switched connection. The dialing information is about the digits or data dialed by the user.

According to a next box 718, the capabilities of the device are sent using the connection. The capabilities are sent as capabilities data, for use for this call.

According to a next box 720, voice signals are received from an analog wideband telephone, such as telephone 606.

According to a next box 730, the received voice signals are digitally encoded. Encoding is at a rate of at least 16 kbps, or even higher.

According to a next box 740, groups of the voice data bits are packetized into intermediate packets, such as intermediate packets 662, 663. These intermediate packets 662, 663 do not necessarily meet the minimum protocol of the network.

According to an optional next box 750, additional data is multiplexed with the intermediate packets. This may be performed if a modem, such as modem 616, is a DSVD modem. The additional data need not be voice data.

According to an optional next box 760, the intermediate packets are transmitted through the circuit switched connection.

According to an optional next box 770, return intermediate packets are depacketized to produce return voice data bits.

According to an optional next box 775, any non-voice data is demultiplexed from the return intermediate packets. This is the inverse action of what was described in box 750.

According to an optional next box 780, the return voice data bits are decoded to produce a digital return voice signal.

According to an optional next box 790, the digital return voice signal is converted into an analog signal.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device for use with a voice gateway coupled in a network adapted to transmit network packets that meet a minimum packet switched network protocol, comprising:
   a Wide Band (WB) telephone adapted to convert sound into sound signals that capture a wideband bandwidth of the sound;
   an encoder coupled to receive the sound signals and to encode them as voice data bits;
   a packetizer for packetizing groups of the voice data bits into intermediate packets without sufficient header information for transport over a packet switched network protocol; and
   a modem adapted to establish a first circuit switched connection with the voice gateway, and coupled to transmit the intermediate packets through the first connection.

2. The device of claim 1, further comprising:
   a decoder coupled to receive other voice data bits through the connection and the modem.

3. The device of claim 1, wherein the modem is a Digital Simultaneous Voice and Data (DSVD) modem.

4. The device of claim 1, wherein
   the wideband bandwidth of the sound is within a range of 200 Hertz (Hz) to 5 Hz.

5. The device of claim 1, wherein
   the sound signals are encoded to capture the wideband signal range and the first circuit switched connection only supports a bandwidth lower than the wideband bandwidth.

6. The device of claim 1, wherein
   the encoder encodes at a rate of at least 16 kbps.

7. A device comprising:
   means for establishing a first circuit switched telephone connection with a first device at a first endpoint of a network capable of transmitting network data packets which meet a minimum packet switched network protocol;
   means for converting sound into sound signals;
   means for encoding the sound signals into voice data bits;
   means for packetizing groups of the voice data bits into intermediate packets which do not meet the minimum packet switched network protocol for transport over a packet switched network; and
   means for transmitting the intermediate packets through the first circuit switched telephone connection.

8. The device of claim 7, further comprising:
   means for multiplexing additional data with the voice data bits prior to transmitting.

9. The device of claim 7, further comprising:
   means for receiving through the first connection return intermediate packets;
   means for depacketizing the return intermediate packets to derive return voice data bits;
   means for decoding the return voice data bits to produce return sound signals; and
   means for producing a return sound from the return sound signals.

10. The device of claim 7, wherein
    the sound signals are encoded into voice signals at a wideband encoding rate and transmitted over the first circuit switched telephone connection at a rate that is less than the wideband encoding rate.

11. A gateway comprising:
    a network interface for coupling to a network;
    a processor coupled with the network interface, wherein the processor is adapted to establish a first circuit switched telephone connection with a modem;
    establish a second packet switched network connection through a network with a device at an endpoint of the network;
    receive through the first connection a stream of intermediate packet switched network packets that do not include headers necessary for transport over the packet switched network and include voice data bits which represent sound that has been encoded;
    add packet headers to the intermediate packets to form network packets; and
    transmit the network packets through the second connection.

12. The gateway of claim 11, wherein the processor is further adapted to
    receive first dialing information,
    wherein the first dialing information is used to establish the second connection.

13. The gateway of claim 11, wherein
    the packet headers include at least one of IP type headers, UDP type headers and RTP type headers.

14. The gateway of claim 11, wherein
    the voice data bits have been encoded at a high bandwidth rate and the first circuit switched telephone connection only supports a lower bandwidth rate.

15. The gateway of claim 11, wherein
the stream includes non-voice data bits,
and the processor is further adapted to:
demultiplex the voice data bits from the non-voice data bits in the stream prior to adding the headers.

16. An adapter for an analog wideband telephone to communicate with a voice gateway coupled in a network adapted to transmit network packets that meet a minimum packet switched network transport protocol, the adapter comprising:
an analog to digital converter for digitizing voice signals received from the analog wideband telephone;
an encoder coupled to receive the digitized voice signals and to encode them as voice data bits;
a packetizer for packetizing groups of the voice data bits into intermediate packets which do not meet the minimum packet switched transport network protocol; and
a modem adapted to establish a first circuit switched connection with the voice gateway, and adapted to be coupled to transmit the intermediate packets through the first connection.

17. The adapter of claim 16, further comprising:
a depacketizer for depacketizing return intermediate packets which do not meet the minimum protocol to produce return voice data bits;
a decoder for decoding the return voice data bits to produce a digital return voice signal; and
a digital to analog converter for converting the digital return voice signal into an analog signal for the analog wideband telephone.

18. A gateway comprising:
a network interface for coupling to a network; and
a processor coupled with the network interface, wherein the processor is adapted to establish a first packet switched network connection through a network with a device at an endpoint of the network;
establish a second circuit switched telephone connection with a modem;
receive through the first connection a stream of network packets that transport voice data bits that represent sound which has been encoded;
strip packet headers from the network packets to yield intermediate packets that do not conform with a minimum packet switched network protocol; and
transmit the yielded intermediate packets through the second connection.

19. The gateway of claim 18, wherein the processor is further adapted to:
receive second dialing information,
wherein the second dialing information is used to establish the second connection.

20. The gateway of claim 18, wherein
the packet headers include at least one of IP type headers, UDP type headers and RTP type headers.

21. The gateway of claim 18, wherein
the first connection supports a data transmission at a rate not exceeding 28.8 kbps.

22. A device comprising:
means for establishing a first packet switched network connection through a network with a device at an endpoint of the network;
means for establishing a second circuit switched telephone connection with a modem;
means for receiving through the first connection a stream of network packets that transport voice data bits that represent sound which has been encoded at a rate of at least 16 kbps;
means for stripping packet headers from the network packets to yield intermediate packets; and
means for transmitting the yielded intermediate packets through the second connection.

23. The device of claim 22, further comprising:
means for receiving second dialing information,
wherein the second dialing information is used by the means for establishing the second connection.

24. The device of claim 22, wherein
the packet headers include at least one of IP type headers, UDP type headers and RTP type headers.

25. The device of claim 22, wherein
the first connection supports a data transmission at a rate not exceeding 28.8 kbps.

26. A device comprising:
means for establishing a circuit switched connection with a voice gateway coupled in a network which is adapted to transmit network packets that meet a minimum protocol;
means for receiving voice signals from an analog wideband telephone, the voice signals encoding sound in a range of at least 200 Hz to 5 kHz;
means for digitizing the received voice signals;
means for encoding the digitized voice signals as voice data bits at a rate of at least 16 kbps;
means for packetizing groups of the voice data bits into intermediate packets which do not meet the minimum protocol; and
means for transmitting the intermediate packets through the circuit switched connection.

27. The device of claim 26, further comprising:
means for packetizing return intermediate packets which do not meet the minimum protocol to produce return voice data bits;
means for decoding the return voice data bits to produce a digital return voice signal; and
means for converting the digital return voice signal into an analog signal.

28. An article comprising: a storage medium, said storage medium having stored thereon instructions, that, when executed by at least one device, result in:
establishing a first circuit switched telephone connection with a modem;
establishing a second packet switched network connection through a network with a device at an endpoint of the network;
receiving through the first connection a stream of intermediate packets that include voice data bits which represent sound that has been encoded and do not conform to a minimum packet switched network protocol;
adding packet headers to the intermediate packets to form network packets that conform with the packet switched network protocol; and
transmitting the network packets through the second connection.

29. The article of claim 28, wherein executing the instructions further results in:
receiving first dialing information,
wherein the first dialing information is used to establish the second connection.

30. The article of claim 29, wherein
the packet headers include at least one of IP type headers, UDP type headers and RTP type headers.

31. The article of claim 30, wherein
the first connection supports a data transmission at a rate not exceeding 28.8 kbps.

32. The article of claim 28, wherein
the stream includes non-voice data bits,
and the instructions further result in:
demultiplexing the voice data bits from the non-voice data bits in the stream prior to adding the headers.

33. An article comprising: a storage medium, said storage medium having stored thereon instructions, that, when executed by at least one device, result in:
establishing a first packet switched network connection through a network with a device at an endpoint of the network;
establishing a second circuit switched telephone connection with a modem;
receiving through the first connection a stream of network packets that transport voice data bits that represent sound which has been encoded and do not conform to a minimum packet switched network protocol;
stripping packet headers from the network packets to yield intermediate packets that conform with the packet switched network protocol; and
transmitting the yielded intermediate packets through the second connection.

34. The article of claim 33, wherein executing the instructions further results in:
receiving second dialing information,
wherein the second dialing information is used to establish the second connection.

35. The article of claim 33, wherein
the packet headers include at least one of PPP type headers, IP type headers, UDP type headers and RTP type headers.

36. A method comprising:
establishing a first circuit switched telephone connection with a first device at a first endpoint of a network capable of transmitting data packets which meet a minimum protocol;
converting sound into sound signals;
encoding the sound signals into voice data bits at a rate of at least 16 kbps;
packetizing groups of the voice data bits into intermediate packets which do not meet the minimum protocol; and
transmitting the intermediate packets through the first connection.

37. The method of claim 36, wherein
the first connection supports a data transmission at a rate not exceeding 28.8 kbps.

38. The method of claim 36, further comprising:
multiplexing additional data with the voice data bits prior to transmitting.

39. The method of claim 36, wherein
the bandwidth includes a range of 150 Hz to 7.1 kHz.

40. A method comprising:
establishing a first circuit switched telephone connection with a first device at a first endpoint of a network capable of transmitting data packets which meet a minimum protocol;
converting sound into sound signals;
encoding the sound signals into voice data bits at a rate of at least 6 kbps;
packetizing grounds of the voice data bits into intermediate packets which do not meet the minimum protocol;
transmitting the intermediate packets through the first connection;
receiving through the first connection return intermediate packets;
depacketizing the return intermediate packets to derive return voice data bits;
decoding the return voice data bits to produce return sound signals; and
inputting the return sound signals into a speaker to produce a return sound in a second bandwidth that includes a range of 1 kHz to 5 kHz.

41. A method comprising:
establishing a first circuit switched telephone connection with a modem;
establishing a second packet switched network connection through a network with a device at an endpoint of the network;
receiving through the first connection a stream of intermediate packets that include voice data bits which represent sound that has been encoded at a rate of at least 16 kbps and do not conform with the packet formatting required for sending packets over the second packet switched network;
adding packet headers to the intermediate packets to form network packets that conform with the packet formatting required for sending packets over the second packet switched network; and
transmitting the network packets through the second connection.

42. The method of claim 41, further comprising:
receiving first dialing information,
wherein the first dialing information is used to establish the second connection.

43. The method of claim 41, wherein
the packet headers include at least one of IP type headers, UDP type headers and RTP type headers.

44. The method of claim 41, wherein
the first connection supports a data transmission at a rate not exceeding 28.8 kbps.

45. The method of claim 41, wherein
the stream includes non-voice data bits,
and further comprising:
demultiplexing the voice data bits from the non-voice data bits in the stream prior to adding the headers.

46. A method comprising:
establishing a first packet switched network connection through a network with a device at an endpoint of the network;
establishing a second circuit switched telephone connection with a modem that does not support transmission at a wideband sound rate;
receiving through the first connection a stream of packets that transport voice data bits that represent sound encoded at a wideband sound rate which includes packet headers required for transporting the packets across the packet switched network;
stripping the packet headers from the network packets to yield intermediate packets that no longer include the headers necessary for transporting the packets over the packet switched network; and
transmitting the intermediate packets through the second connection.

47. The method of claim 46, further comprising:
receiving second dialing information regarding the modem,
wherein the second dialing information is used to establish the second connection.

48. The method of claim 46, wherein
the packet headers include at least one of IP type headers, UDP type headers and RTP type headers.

49. The method of claim 46, wherein
the second connection supports a data transmission at a rate not exceeding 28.8 kbps.

50. A method comprising:

establishing a circuit switched connection with a voice gateway coupled in a network which is adapted to transmit network packets that meet a minimum protocol;

receiving voice signals from an analog wideband telephone, the voice signals encoding sound in a range of at least 200 Hz to 5 kHz;

digitizing the received voice signals;

encoding the digitized voice signals as voice data bits at a rate of at least 16 kbps;

packetizing groups of the voice data bits into intermediate packets which do not meet the minimum protocol; and transmitting the intermediate packets through the circuit switched connection.

51. The method of claim 50, further comprising:

depacketizing return intermediate packets which do not meet the minimum protocol to produce return voice data bits;

decoding the return voice data bits to produce a digital return voice signal; and converting the digital return voice signal into an analog signal.

\* \* \* \* \*